United States Patent [19]
Yanagawa

[11] Patent Number: 5,726,961
[45] Date of Patent: Mar. 10, 1998

[54] OPTICAL PICKUP CONTROL SYSTEM FOR OPTICAL DISCS HAVING DIFFERENT REFLECTIVITIES

[75] Inventor: Naoharu Yanagawa, Saitama-ken, Japan

[73] Assignee: Pioneer Electronic Corporation, Tokyo, Japan

[21] Appl. No.: 819,487

[22] Filed: Mar. 17, 1997

Related U.S. Application Data

[63] Continuation of Ser. No. 513,295, Aug. 10, 1995, which is a continuation of Ser. No. 284,270, Aug. 2, 1994, which is a continuation of Ser. No. 955,374, Oct. 1, 1992.

[30] Foreign Application Priority Data

Feb. 21, 1992 [JP] Japan ............... 4-072292

[51] Int. Cl.$^6$ .................................................. G11B 7/09
[52] U.S. Cl. ................ 369/44.31; 369/116; 369/58
[58] Field of Search .................... 369/54, 58, 59, 369/116, 44.31, 44.32, 44.27, 44.29, 44.11

[56] References Cited

U.S. PATENT DOCUMENTS

| 4,093,961 | 6/1978 | Kanamaru | 358/128 |
| 4,334,301 | 6/1982 | Kanamaru | 369/116 |
| 4,721,850 | 1/1988 | Sakai et al. | 369/44.31 |
| 4,956,832 | 9/1990 | Miyasaka | 269/58 X |
| 4,972,399 | 11/1990 | Miyasaka | 369/58 X |
| 5,042,020 | 8/1991 | Endo | 369/44.31 |
| 5,058,092 | 10/1991 | Miyasaka | 369/58 X |
| 5,105,409 | 4/1992 | Kaku et al. | 369/44.31 |
| 5,172,352 | 12/1992 | Kobayashi | 369/116 X |
| 5,216,659 | 6/1993 | Call et al. | 369/116 |
| 5,289,451 | 2/1994 | Ashinuma et al. | 369/58 |

FOREIGN PATENT DOCUMENTS

| 25 52 648 | 5/1977 | Germany. | |
| 40 16 550 | 11/1991 | Germany. | |
| 0060742 | 4/1984 | Japan | 369/54 |
| 61-115250 | 6/1986 | Japan. | |

OTHER PUBLICATIONS

Patent Abstracts of Japan, vol. 10, No. 300, Oct. 14, 1986.

Primary Examiner—Thang V. Tran
Attorney, Agent, or Firm—Nikaido Marmelstein Murray & Oram LLP

[57] ABSTRACT

An optical pickup control system is provided for recording and reproducing information on various types of discs which have different reflectivities of light. The pickup has a semiconductor laser radiating a laser beam, and a photodetector detecting reflected light from the disc for controlling tracking and focusing of the beam. An automatic laser power control device is provided for controlling the power of the laser beam from the semiconductor laser such that the detected lights by the photodetector become a predetermined value.

2 Claims, 7 Drawing Sheets

OPTICAL PICKUP CONTROL SYSTEM FOR OPTICAL DISCS HAVING DIFFERENT REFLECTIVITIES

This application is a a continuation application of prior application Ser. No. 08/513,295, filed on Aug. 10, 1995 which is a continuation of Ser. No. 08/284,270 filed on Aug. 2, 1994 which is a continuation of Ser. No. 07/995,374 filed Oct. 1, 1992.

FIELD OF THE INVENTION

The present invention relates to an optical pickup control system of an optical disc player, and more particularly to a control system where a pickup head of the pickup is used for an optical disc having different reflectivity of the light.

BACKGROUND OF THE INVENTION

There are optical discs such as a read only CD and a writable disc. Further, as a writable optical disc having a high recording density, a write once (CD-WO) disc and an erasable (CD-R) disc are provided. Information is recorded on the disc and reproduced with a laser beam. These discs are different from the CD in the material of the recording surface.

For example, the CD-WO disc has a tellurium or bismuth recording surface on which the lasers burn pits for recording. In another type of the CD-WO discs, the lasers are focused on a recording surface coated with a selenium antimony ($Sb_2Se_3$) thin film, or an oxide tellurium (TeOx) thin film, or a thin film of organic pigment, changing the reflectivity of the light.

The CD-R disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby reversing the direction of the magnetic field. To read the recorded information, the laser is irradiated on the recording surface so that polarized wave front slightly rotates as a result of the Kerr effect. Thus only the polarized wave deflected by the rotation is read by a photodetector, thereby enabling reading of the information.

The recording surface of the CD is coated with an aluminum thin film, thereby providing a high reflectivity of the light, about 90%. On the other hand, the recording surface of the CD-WO disc or CD-R disc is coated with a thin film of organic pigment or amorphous alloy. Consequently, the disc has a low reflectivity of about 30%. Accordingly, a pickup head for the CD can not be used for recording information on the CD-R disc and the CD-WO disc and for reproducing recorded information from the CD and the CD-R and CD-WO discs. Therefore, it is necessary to provide pickup heads for the respective discs.

In order that the pickup head can be used for the discs having different reflectivities of the light, the player must be designed such that the electrical gain of the servo system of the player can be changed at a time when the disc is changed to another of disc. For such a system, it is necessary that, at least focus and tracking servo gains, total quantity of the reflected light on a photodetector, and amplitude of a reproduced RF signal for the respective discs can be changed. It is extremely difficult to provide such a system. Furthermore, it is necessary to set the power of the laser beam from a laser device to either the CD or the CD-WO disc. In the case that the laser power is set to that for the CD, when the CD-R or CD-WO disc is used, the quantity of the reflected light to the photodetector is reduced to one-third, which is disadvantageous in S/N ratio.

SUMMARY OF THE INVENTION

An object of the present invention is to provide an optical pickup control system which can be used for various types of discs with a simple structure.

According to the present invention, there is provided an optical pickup control system for various types of discs having different reflectivities of light, the pickup having a semiconductor laser radiating a laser beam, a photodetector detecting reflected lights from the discs for controlling tracking and focusing of the beam, the system comprising laser power control means for controlling the power of the laser beam from the semiconductor laser such that the detected lights by the photodetector become a predetermined value.

The other objects and features of this invention will become understood from the following description with reference to the accompanying drawings.

DETAILED DESCRIPTION OF THE PREFERRED EMBODIMENTS

Figure 1:
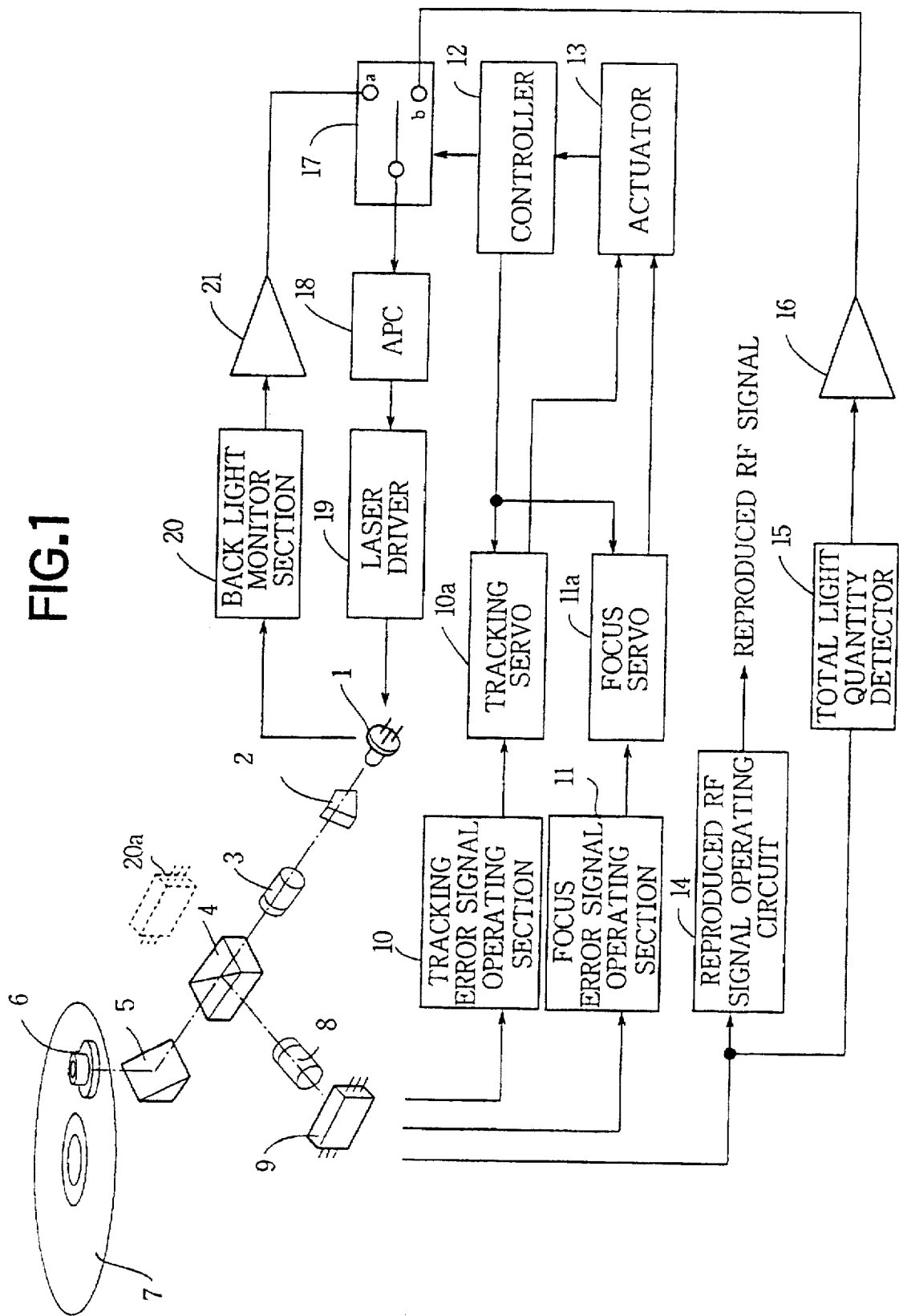
FIG. 1 schematically shows an optical pickup control system according to the present invention.

Referring to FIGS. 1 showing an optical system according to the present invention, a laser beam emitted from a semiconductor laser device 1 is paralleled through a grating 2 and a collimator lens 3 and fed to a prism 5 passing through a beam splitter 4. The laser beam is reflected on the prism 5 to an optical disc 7 and focused thereon by an objective 6.

The reflected beam from the optical disc 7 is reflected on the prism 5 to the beam splitter 4 where the beam is changed in a perpendicular direction and supplied to a condenser 8. The beam is focused on a photodetector 9 on which divided photo sensors are provided.

The photodetector 9 detects a tracking error and a focus error in accordance with the spot of the beam, and applies detected tracking error and focus error signals to a tracking error signal operating section 10 and a focus error signal operating section 11, respectively. The operating sections 10 and 11 calculate a tracking error and a focus error, and applies the tracking error and the focus error to a tracking servo 10a and a focus servo 11a. The tracking servo 10a and the focus servo 11a apply actuating signals to an actuator 13. The actuator 13 operates such that the errors calculated at the operating sections 10 and 11 becomes zero.

The signal from the photodetector 9 is further applied to a reproduced RF operating section 14 where a reproduced RF is calculated for producing a reproduced RF signal.

A controller 12 is provided for controlling the tracking servo 10a and the focus servo 11a.

The photodetector 9 further detects reflectivity of the reflected light and applies a reflection signal to a total light quantity detector 15. The detector 15 detects the total quantity of the light received on the photodetector 9 and applies a detected signal to a terminal b of a switch 17 through an amplifier 16. The switch 17 has another terminal a and is controlled by the controller 12 for selectively connecting the terminal a or b.

A back light monitor 20 is provided adjacent the semiconductor laser 1 for monitoring the laser beam from the laser 1. A monitor signal is applied to the terminal a of the switch 17 through an amplifier 21. The power of the laser beam from the laser 1 is controlled by an automatic power controller (APC) device 18 through a laser driver 19. The movable contact of the switch 17 is connected to the APC 18. The APC operates to control the laser so that the total quantity of the light received by the photodetector 9 may become a predetermined value.

In place of the back light monitor 20, a front monitor 20a can be used.

Figure 2:
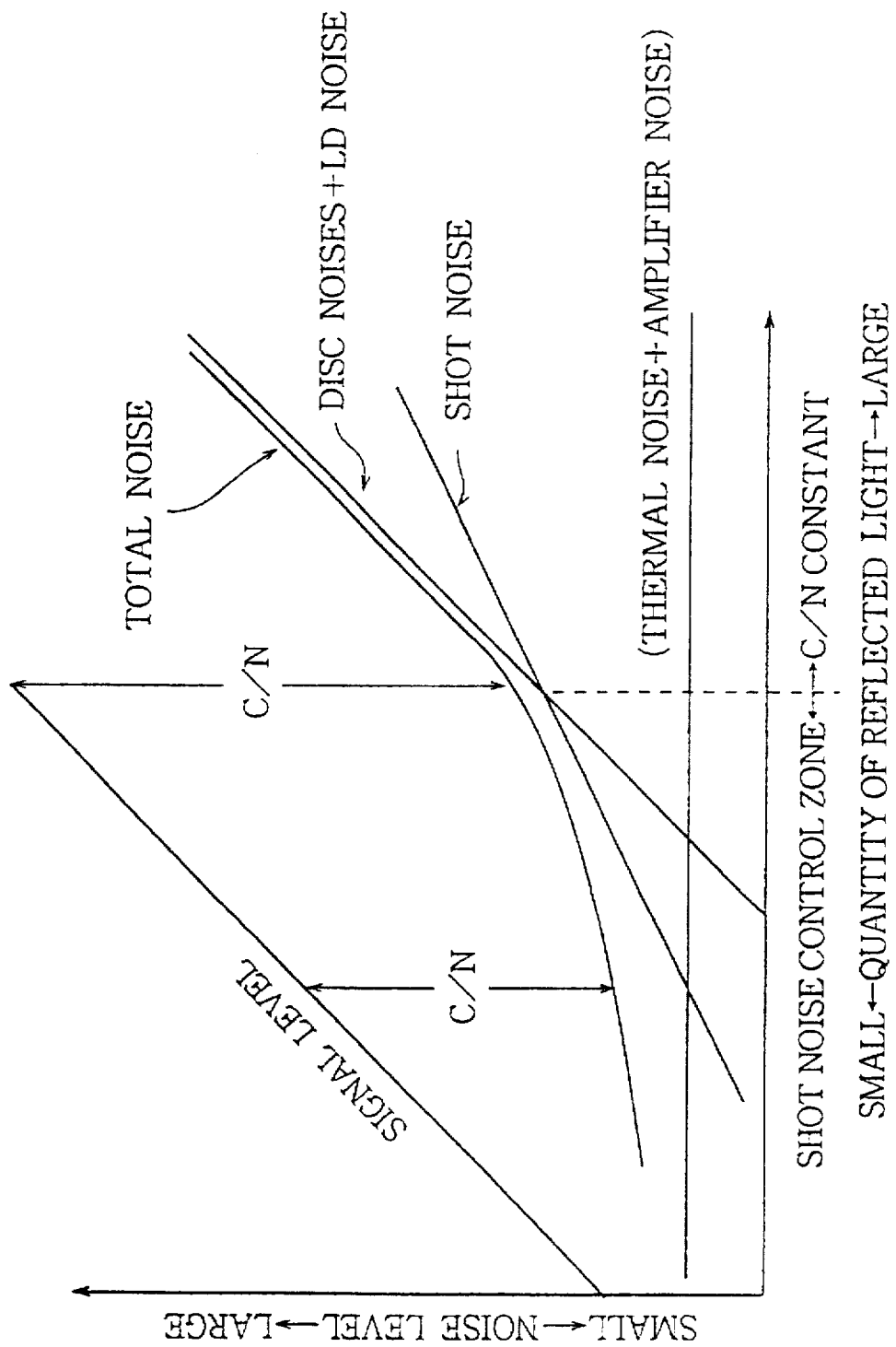
FIG. 2 is a graph showing a relationship between quantity of light received on a photodetector and a level of noise of an optical disc.

FIG. 2 shows the relationship between the quantity of the received light reflected on the divided photo sensors of the photodetector 9 and the level of noises of the optical disc. The sum of thermal noise and amplifier noise is constant irrespective of the quantity of received light on the photodetector 9. The sum of noises of the respective discs and noise of a laser diode of the semiconductor laser 1 increases in proportion to the received light of the photodetector. Namely, the sum increases in parallel with a level of the signal.

Shot noise in is proportional to the received light by the square root and represented as follows.

$$in = (2 e I)^{1/2}$$

where e is the electric charge of $6 \times 10^{-19}$C, and I is the average current in the photodetector 9.

There is a border between a shot noise control zone and a C/N (carrier to noise) ratio constant zone in accordance with noises of the respective discs. Consequently, it is effective to increase the laser power to the level of the border where the laser power is controlled as the C/N ratio is constant.

Alternatively, both of the laser power and the electrical gain are increased. In other words, if the laser power is excessively increased, the life of the laser diode is shortened. Therefore, the level of the laser power is reduced, and the electrical gain is accordingly increased to compensate the shortage of the laser power.

The operation of the system for controlling the laser power will be described with reference to the flowchart of FIG. 3.

In the description, the laser power used to read the recorded information on the CD is about 0.5 mW. The laser power to read the information on the CD-WO disc is about 1.5 mW.

Namely, the CD-WO disc needs the laser power three times as large as the CD. Thus, when the CD-WO disc is used, the APC 18 operates to increase the laser power three times as large as that of the CD.

When the CD having high reflectivity is reproduced, the controller 12 operates to connect the movable contact of the switch 17 to the terminal a at a step 301. The laser 1 radiates the laser beam which is focused on the disc 7 through the objective 6. The back light monitor 20 monitors the radiated laser beam and applies the monitor signal to the APC 18 through the switch 17. The reflected light from the disc 7 is focused on the photodetector 9 through the condenser 8.

At a step 302, the controller 12 operates the focus servo 11a to focus the beam on the disc. At a step 303, it is determined whether the beam is focused on the disc or not. If the beam is focused on the disc, the controller 12 operates to connect the movable contact to the terminal b at a step 304. The total quantity of the light detected at the total light quantity detector 15 is applied to the APC 18. The APC 18 produces a control signal based on the detected signal which is applied to the laser driver 19. The laser driver 19 adjusts the power of the laser beam of the laser 1 such that the total quantity of the light received on the photodetector 9 becomes a predetermined value.

If the beam is not focused at the step 303, the program returns to the step 301.

In accordance with the present-invention, when the CD-WO disc is used, the power of the laser beam is controlled to a predetermined value for reproducing and recording information on the CD-WO disc.

However, in such a system, if the beam is not focused, no signal is applied to the APC 18. Accordingly, it may occur that the semiconductor laser 1 is excessively driven to generate an excessively high power.

Figure 4:
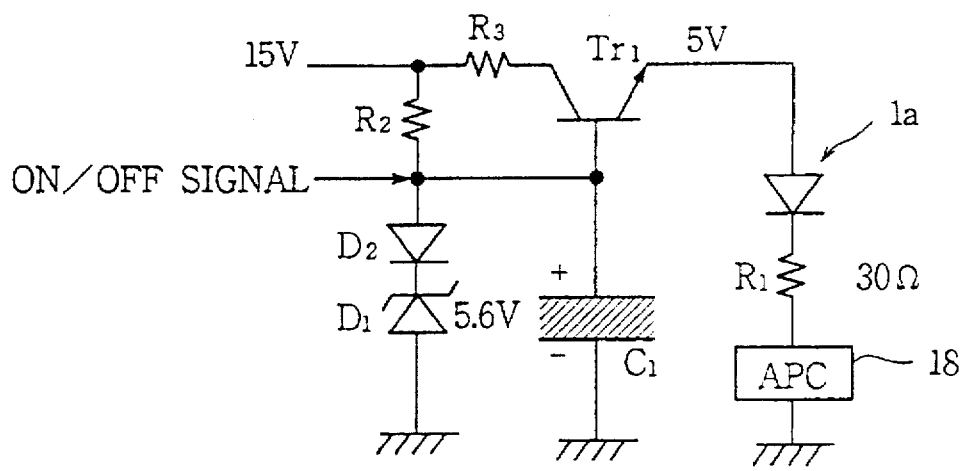
FIG. 4 shows a circuit for protecting a laser device.

FIG. 4 shows a circuit provided on the system for protecting the semiconductor laser from becoming a high power condition. The circuit comprises a transistor Tr1 an emitter of which is connected to a laser diode 1a of the semiconductor laser 1. A collector of the transistor is connected to a power source of 15V through a resistor R3. A base of the transistor is connected to a zener diode D1 through a diode D2. The laser diode 1a is connected to the APC 18 through a resistor R1.

If the circuit is composed such that the current of 100 mA or more is not fed to the diode 1a and forward voltage in the laser diode 1a is 2V, $$30\Omega \times 100 \text{ mA} + 2V = 5V$$

Thus, the output voltage at the emitter of the transistor is held to 5V at its maximum.

Figure 5:
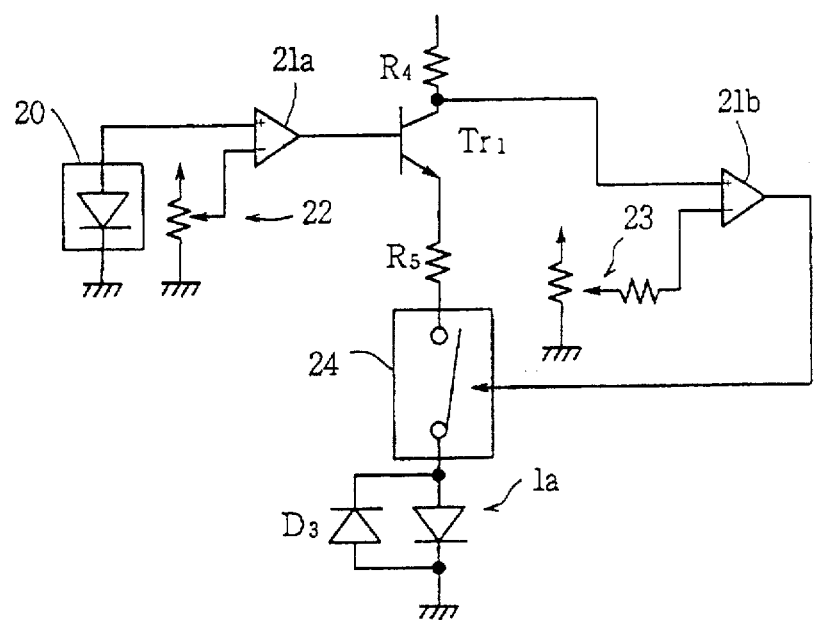
FIG. 5 shows another example of the protective circuit.

FIG. 5 shows another example of the protective circuit. The circuit has a differential amplifier 21a the output of which is connected to the base of the transistor Tr1. A non-inverting input terminal of the amplifier 21a is connected to the back light monitor 20 and an inverting input terminal thereof is connected to a laser power setting section 22. The section 22 operates to set a predetermined laser power. The collector of the transistor Tr1 is connected to a resistor R4 and to a non-inverting input terminal of a differential amplifier 21b. An inverting input terminal of the amplifier 21b is connected to a limit power setting section 23. The section 23 operates to set a limit value of the laser power. The emitter of the transistor Tr1 is connected to the laser diode 1a through a resistor R5 and a switch 24. The switch 24 is operated by an output of the amplifier 21b. Reference numeral D3 is a protective diode.

When the voltage applied to the non-inverting input of the amplifier 21b is higher than the limit value set at the power limit setting section 23, the switch 24 is opened in accordance with the output of the differential amplifier 21b to cut off the current to the laser diode 1a.

Figure 6:
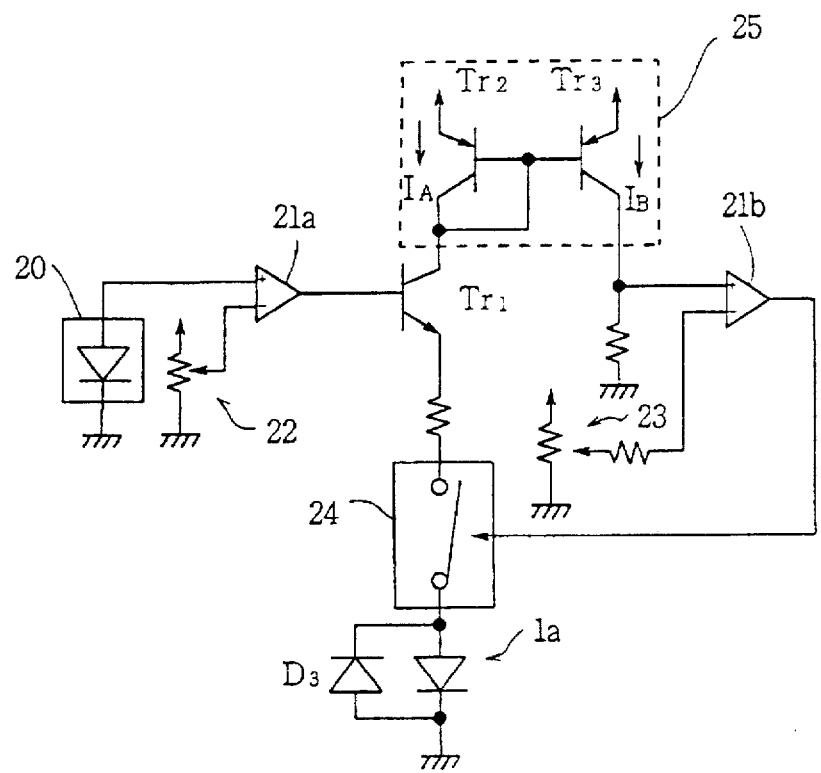
FIG. 6 shows a further example of the protective circuit.

FIG. 6 shows a further example of the protective circuit where a current mirror circuit 25 comprising transistors Tr2 and Tr3 is provided in place of the resistor R4 of FIG. 5.

Since the current IA fed to the laser diode 1a is equal to the current IB fed to the differential amplifier 21b, the switch 24 is operated in accordance with the amplifier 21b in the same manner as the example of FIG. 5.

Figure 7:
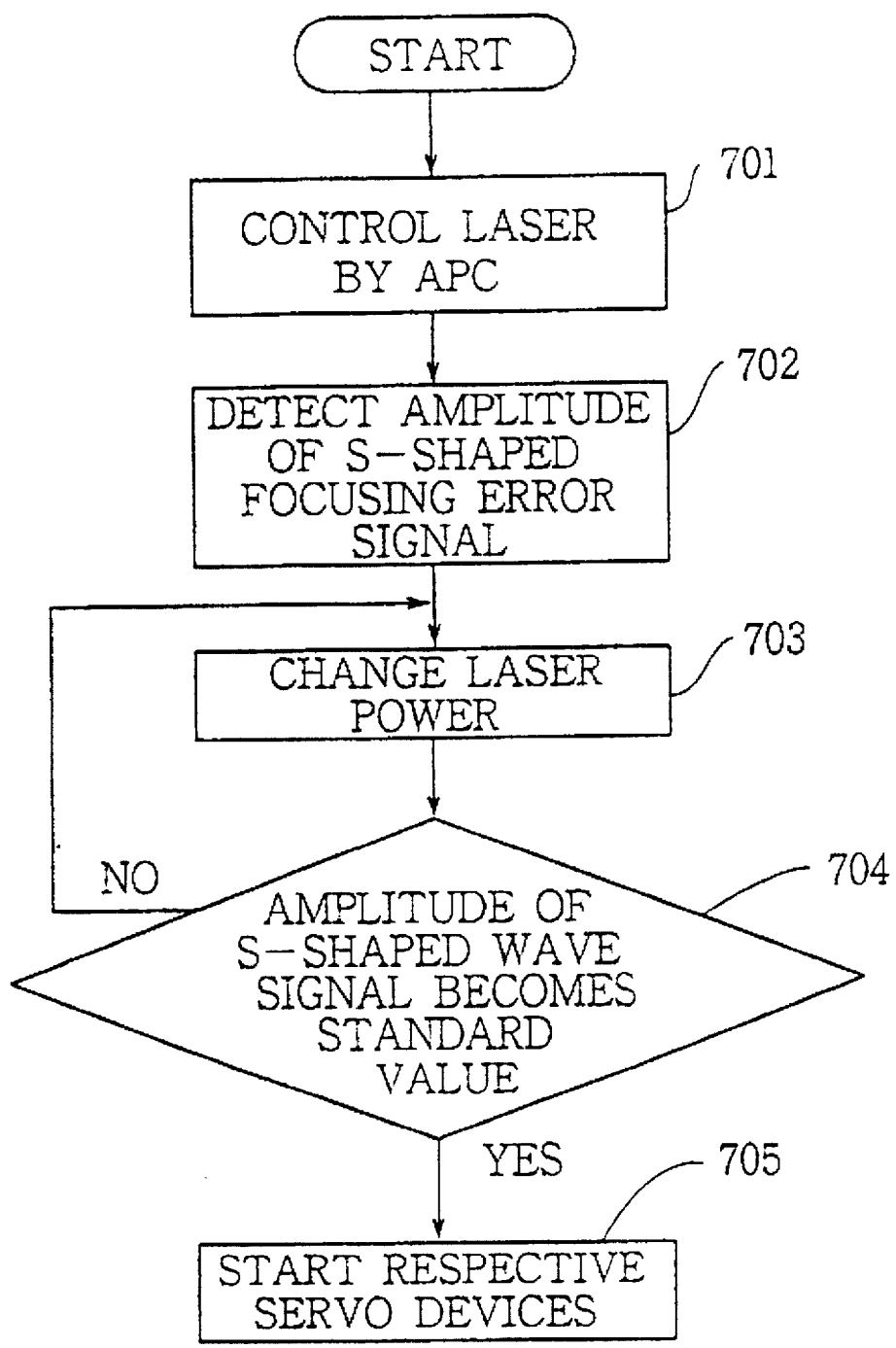
FIG. 7 is a flowchart showing an operation of the system without the protective circuit.

If the protective circuit is not provided, the laser power is controlled in accordance with the operation shown by the flowchart of FIG. 7.

Figure 3:
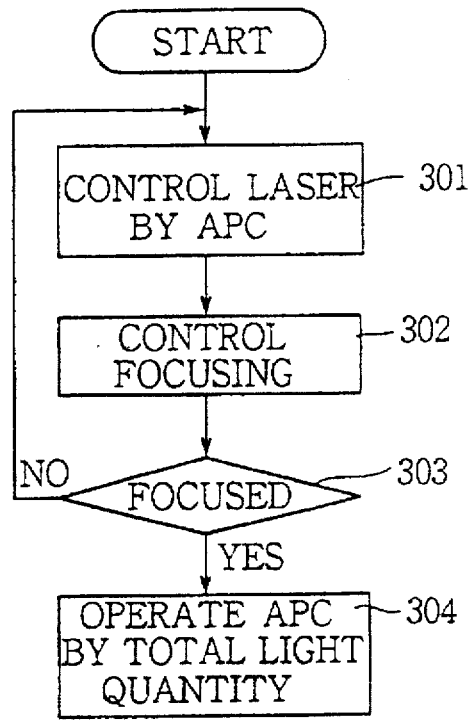
FIG. 3 is a flowchart showing an operation of the system.

At a step 701, the same program as the step 301 of FIG. 3 of the previous embodiment is performed. At a step 702, the controller 12 monitors the operation of the focus servo 11a and detects the amplitude of the S-shaped wave focus error signal. At a step 703, the APC 18 is operated to change the laser power of the laser 1. At a step 704, it is determined whether the amplitude of the focus error signal becomes a standard value or not. If yes, it means that the beam received on the photodetector becomes the predetermined value. At a step 705, the focus servo 11a as well as the other servos is operated.

Figure 8:
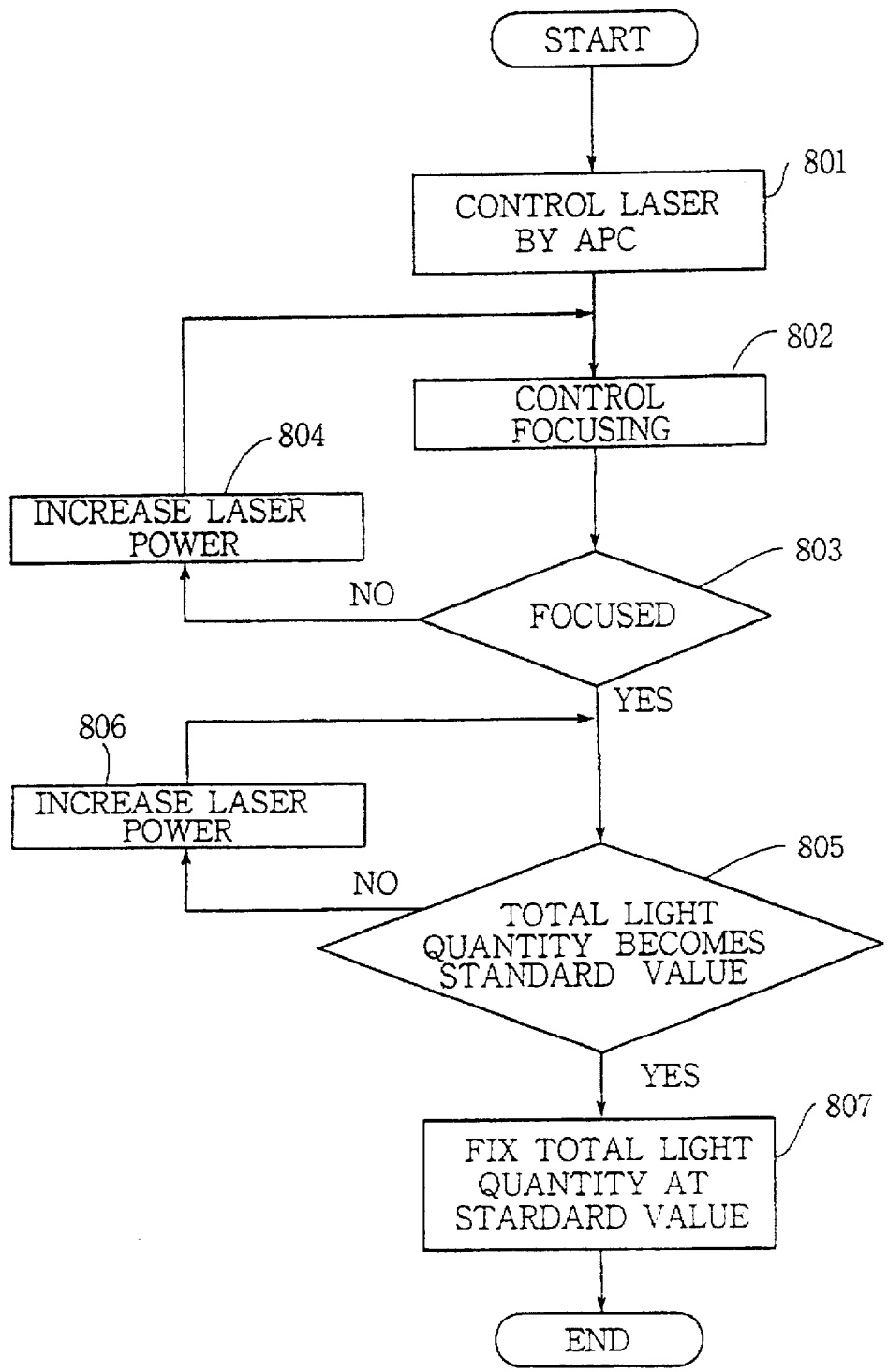
FIG. 8 is a flowchart showing another operation of the system.

FIG. 8 shows another modification of the operation. At steps 801 to 803, the same programs as the steps 301 to 303 of FIG. 3 are performed. In the operation, if the beam is not focused at the step 803, the program goes to a step 804 where the laser power from the laser 1 is increased by the APC 18 and the program returns to the step 802. If the beam is focused at the step 803, the program goes to a step 805 where it is determined whether the total quantity of the light detected at the detector 15 becomes a standard value or not. If the detected quantity does not become the standard value, the program goes to a step 806 where the laser power is increased and the program returns to the step 805. If yes at the step 805, the program goes to a step 807 where the total quantity of the light is fixed on the standard value.

From the foregoing, in the present invention, the laser power is controlled such that the total quantity of the light becomes a predetermined value corresponding to the disc having the different reflectivity of the light.

Figure 9:
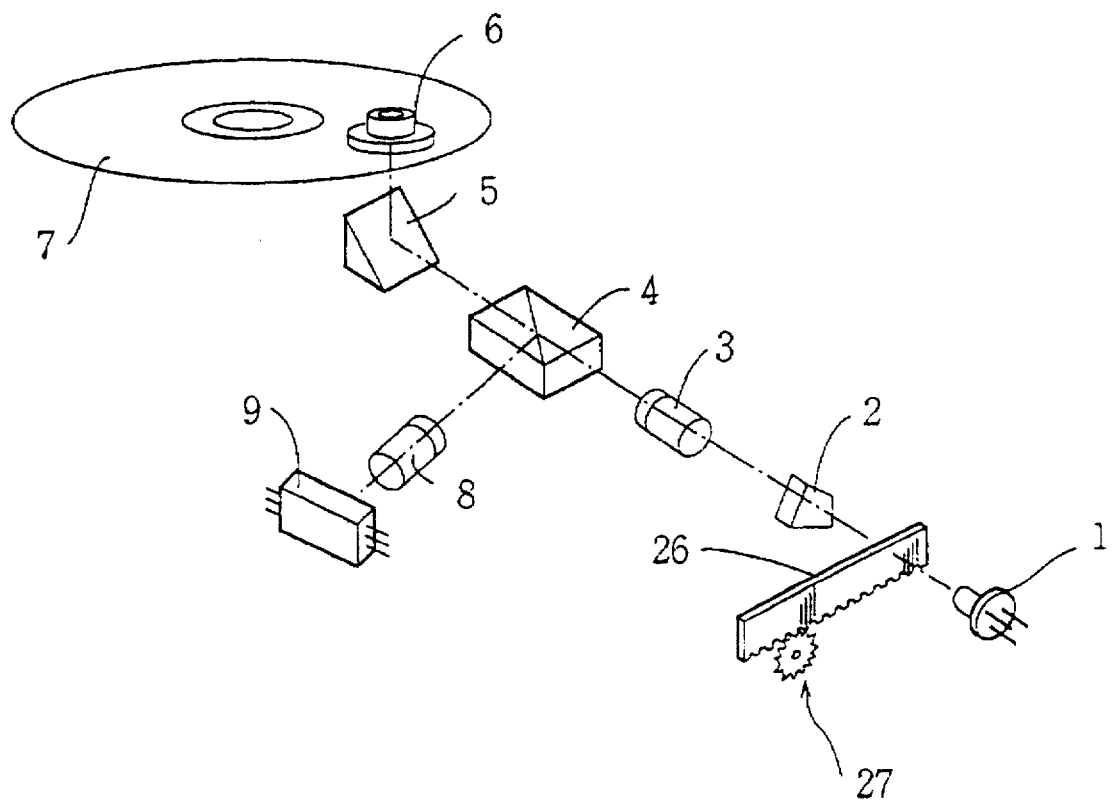
FIG. 9 schematically shows another optical pickup system of the present invention.

Referring to FIG. 9 showing another embodiment of the present invention, a filter 26 is provided in front of the semiconductor laser 1 to reduce the transmittance of light at one-third. The filter 26 has a sliding device 27 comprising a rack and a pinion engaged with the rack. By rotating the pinion, the filter 26 is slide to be positioned in front of the laser 1. The filter 26 is operated based on the detected signal by the detector 15. When the filter 26 is positioned in front of the laser 1, the laser power detected by the detector 15 becomes one-third.

In place of the filter, the other member having liquid crystal, electrooptical effect or acousto optic effect can be used for electrically controlling the transmittance of the light.

The transmittance of the liquid crystal is change by changing the driving voltage.

The electrooptical effect is the phenomenon where if voltage is applied to an electrooptical crystal such as $LiNbO_3$, the refraction thereof changes to change the plane of polarization induced in the crystal. The crystal is provided between a pair of transparent polarized plates to change the quantity of the light in proportion to the applied voltage.

If a waveguide is used, the light transmitted in the waveguide changes in accordance with the voltage applied on a junction.

The acousto optic effect is the effect where if ultrasonic wave is propagated in an acousto optic crystal such as $TeO_2$ or glass by a transducer, periodic variation of the refraction in the crystal acts as diffraction grating, thereby changing the quantity of the light in the crystal. It is possible to change the transmitting light by changing acoustic power.

In accordance with the present invention, since the laser power corresponding to the respective discs is properly controlled to have a constant value, the S/N ratio is prevented from deteriorating. As a result, the pickup head is used for recording information and reproducing the recorded information on the discs having the different reflectivity of the light with a simple structure and can be manufactured at a low cost.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. An optical pickup control system for various types of discs having different reflectivities of light, the optical pickup control system having a pickup having a semiconductor laser radiating a laser beam, a photodetector detecting reflected light from a disc for controlling tracking and focusing of the beam, and a tracking servo and a focus servo responsive to reflected light for performing a tracking operation and a focusing operation, the system comprising:

a light quantity detector for detecting quantity of light received by the photodetector and for producing a detected signal; and laser power control means responding to said detected signal, a) for linearly maintaining a signal level detected by the photodetector to be in a zone where a carrier to noise ratio is constant irrespective of the type of disc by adjusting at least one of the power of the laser beam from the semiconductor laser and electrical gain, and b) for automatically controlling the tracking servo and the focus servo such that tracking and focus error signals are detected.

2. A system according to claim 1 wherein the laser power control means includes an automatic power control device responsive to said detected signal.

* * * * *